Figure 2:
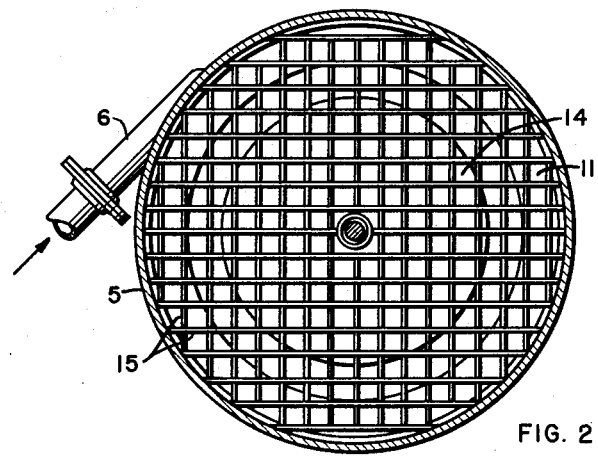

INVENTORS:
KEITH HENRY WALLEY
GERRIT HENDRIK REMAN
BY: *Oswald H. Milmore*
THEIR ATTORNEY 2,912,310

ROTARY CONTACTOR

Keith Henry Walley and Gerrit Hendrik Reman, Amsterdam, Netherlands, assignors to Shell Development Company, New York, N.Y., a corporation of Delaware Application February 7, 1955, Serial No. 486,402

Claims priority, application Netherlands February 24, 1954

2 Claims. (Cl. 23—270.5)

This invention relates to an apparatus and to a method for bringing two or more at least partially mutually immiscible phases of different densities into contact with each other by passage between relatively rotating walls. The said phases are in most instances fluid phases, for instance, both liquid, or a liquid and a gas; one of the phases may, however, be a solid phase which may but need not be very finely divided. Such contacting finds application, for example, in the extraction of liquid mixtures, such as mineral or fatty oils by means of one or more selective solvents, or in carrying out chemical reactions, such as the reaction between higher olefins and sulfuric acid.

The invention is more particularly concerned with contacting operations performed in a contactor comprising an upright, preferably vertical housing, enclosing vertically juxtaposed contacting and settling zones that are in free communication with one another, the contacting zone containing a rotary agitating device mounted for rotation about an upright axis for dispersing one phase into the other. The settling zone is on top of the contacting zone when the dispersed phase has a lower density than the continuous phase, and at the bottom thereof when the density relation is reversed. While the invention is applicable to either of these arrangements, for simplicity in description only the former will be considered in the sequel.

The apparatus may, for example, be of the type known as a rotating disc contactor in which the contacting zone contains a plurality of vertically spaced, annular, transverse stationary baffles having central openings and the agitating device consists of a rotor shaft extending axially through the shell and bearing a plurality of disc-like rotor baffles fixed along the shaft axis to be situated wholly within the compartments between the stationary baffles. Such contactors are described, for instance, in U.S. Patents 2,013,663 and 2,601,674; variants thereof are described in the Netherlands Patents 70,866; 71,608 and 72,682. The invention may also, however, be applied to rotary contacting apparatus of other specific designs, such as one having smooth, concentric walls on the housing and rotor, as described in U.S. Patent 2,474,006.

In apparatus of the character described the continuous phase extends continuously from the contacting zone into the settling zone and the dispersed phase must settle through the continuous phase (upwards when the settling zone is on top) to coalesce and form a continuous layer at a level of the settling zone beyond the continuous phase. There is, hence, an interface within the settling zone between the continuous phase and the coalesced phase.

Applicants have now found that difficulties arise in connection with the settling and coalescence of the dispersed phase, especially in apparatus having large diameters, e.g., five feet or more. These difficulties are caused by considerable turbulence occurring in the settling zone, which gives rise to an acute disturbance of the interface therein. Two phenomena occur as a result of this turbulence: an interfacial vortex is formed by the combination of toroidal vortices created by the rotating agitator, specifically by the rotating discs, and turbulence effects are caused by the introduction of the continuous phase into the contacting zone at a level adjoining the settling zone.

The rotary movement of the dispersion at the end of the contacting zone adjoining the settling zone is transmitted to the liquid in the latter, resulting in a deformation of the interface from a horizontal plane into a pronounced vortex with the central part extending toward the contacting zone. This vortex formation is accompanied by detachment from the vortex of small droplets, leading to a rapid build-up of the dispersed phase outside of the vortex-shaped interface (i.e., below the interface when the lighter phase is dispersed). Particularly bad effects are produced when the interfacial vortex extends into the contacting zone and the small droplets are engaged by the entering stream of continuous phase. Since it is generally known that turbulences are rapidly damped out behind a perforated plate, one might expect that the difficulties could be overcome by providing a perforated plate between the two zones; however, it was found that this simple arrangement had just the opposite effect, particularly when combined with a tangentially disposed inlet for the continuous phase, since the effect of rotation breaks up the vortex to form very fine drops of the dispersed phase which are carried into the contacting zone by the continuous phase, leading to flooding of the contactor.

Considering next the turbulence effects of the introduction of the continuous phase into the contacting zone near the settling zone, it was found that introduction in a radial direction or tangentially in a direction in opposition to the rotation of the agitating device reduces or avoids the above-noted vortex formation. However, a serious drawback of such introduction, particularly at higher inlet velocities such as occur with large-diameter apparatus, is that a considerable degree of turbulence is created at the inlet region by the abrupt change in momentum occurring when the stream enters the bulk of fluid and (with radial introduction) later when it impinges on the wall opposite the inlet port. This turbulence is transmitted into the settling zone and interferes with settling therein, even when a simple perforated plate partition is provided between the zones. Secondly, this turbulence has the effect of breaking up the drops of dispersed phase entering the inlet region from the contacting zone, causing a build-up of dispersed phase in this region in a fine state of subdivision; this is carried back into the contacting zone, leading to flooding. Tangential feed of the continuous phase in the direction of rotation of the agitator aggravates the vortex formation considered above.

It is the object of this invention to improve the smooth separation of the dispersed phase from the continuous phase in rotary contactors of the character described and to avoid the above-noted drawbacks.

According to the present invention the above difficulties are overcome by arresting the horizontal motion of the phases between the contacting and settling zone, whereby the formation of the interfacial vortex and other undesired turbulences in the settling zone are avoided. Further, to avoid the turbulence and break-up of the dispersed phase by the introduction of the continuous phase into the contacting zone near the level of the settling zone, the continuous phase is preferably introduced tangentially in a direction which is the same as the direction of rotation of the agitating device; this mode of feeding the continuous phase is now possible without the undesirable consequence of interfacial vortex formation because the horizontal motion of the phases is arrested.

The apparatus for achieving the above-described effect comprises a vortex-breaking device that is situated between the contacting and settling zones and provides large flow passages bounded by substantially vertical surfaces. The vortex-breaking device may, for example, consist of one or more wide-mesh grids of intersecting plates arranged at different levels or at a common plane (in the manner of an egg crate). Further, it was found advantageous to provide an annular baffle ring extending radially inwards from the contactor wall for a minor portion of the radius thereof to restrict the communication between the two zones to the open, central part thereof, said open part being, however, a major part of the cross sectional area. It was also found to be advantageous to surround the part of the rotor shaft situated within the settling zone with a stationary sheath, e.g., a tube connected to the end wall of the settling enclosure.

Figure 1:
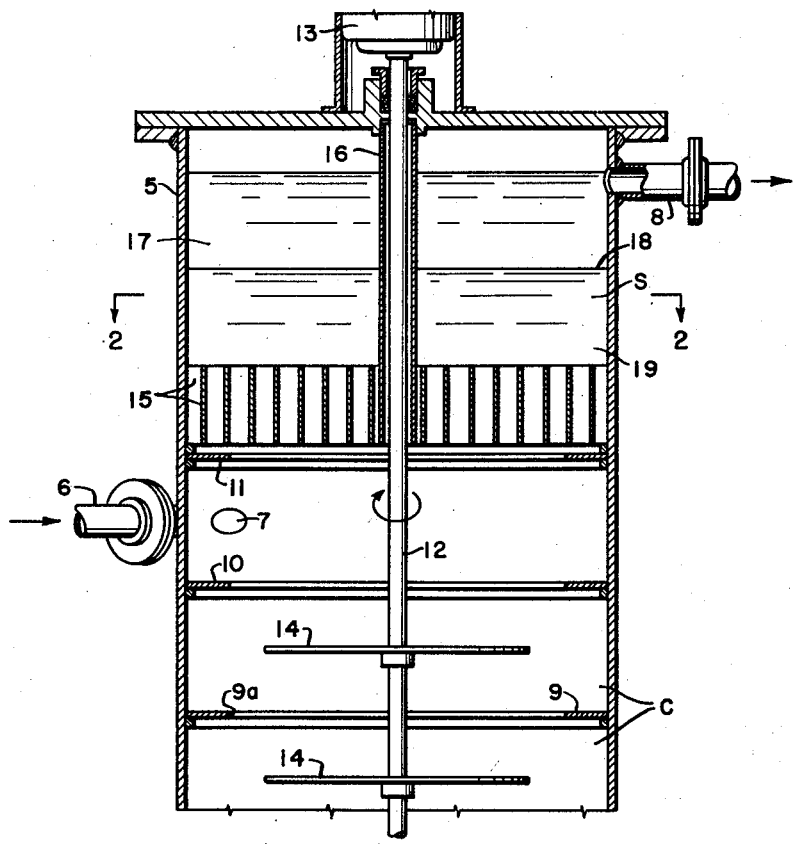

The invention will be further illustrated in connection with the accompanying drawing which forms a part of this specification and shows a preferred embodiment of the invention applied to a rotating disc contactor, wherein:

Figure 1 is a vertical sectional view through the upper part of a rotating disc contactor; and Figure 2 is a transverse section taken on the line 2—2 of Figure 1.

Referring to the drawings in detail, 5 is a housing, in the form of a vertical cylindrical shell enclosing a contacting zone C (only the upper part of which appears) and, vertically juxtaposed to the upper end of said zone, a settling zone S. An inlet pipe 6 for the heavy phase communicates with the upper end of the contacting zone through a tangential inlet opening 7. It will be understood that several such inlet pipes may be provided and that the bottom of the contacting zone is provided with an inlet for the light phase and an outlet for the heavy phase, as shown in U.S. Patent 2,601,674. An outlet pipe 8 communicates with the top of the settling zone for discharging settled light phase. A plurality of annular, stationary baffles 9–11 are mounted in vertically spaced relation throughout the contacting zone and divide the latter into a series of compartments that are in communication with one another through large openings 9a in the baffles. A rotatable shaft 12 is mounted vertically at the axis of the shell and is provided with suitable drive means, such as a motor 13, mounted outside of the shell, whereby the shaft may be rotated in the direction indicated by the arrow, which is the same as the direction of rotation imparted to the heavy phase by entry through the tangential opening 7. The shaft has fixed thereto a plurality of disc-like rotor baffles spaced axially so that each rotor baffle is substantially equi-distance from the stationary baffles above and below it; no rotor baffle is provided between the uppermost stationary baffles 10 and 11, where the heavy phase enters. The rotor baffles 14, which are advantageously smooth circular discs, preferably have diameters less than the diameters of the openings 9a in the stationary baffles, whereby the agitating device may be moved vertically through the stationary baffles.

Between the contacting and settling zones there is a vortex-breaking device in the form of a wide-mesh grid 15, arranged as a transverse partition. This grid may be of an egg-crate construction, including intersecting, thin upright plates to provide unobstructed vertical flow passages of large dimensions and bounded by vertical surfaces. The thickness of the grid (measured vertically) is conveniently about two to ten inches; in most instances heights of four to six inches give satisfactory results. The horizontal spacing between the individual plates of the grid is preferably less than the grid thickness. The portion of the shaft 12 within the settling zone is surrounded by a stationary tubular sheath 16 carried by the end wall of the shell, so that the phases in this zone will not be agitated by the rotation of the shaft.

In operation, the apparatus is first filled with the phase which is to form the continuous phase and thereafter the other phase is admitted continuously at the end of the contacting zone remote from the settler while rotating the shaft 12 and rotor baffles 14. As applied, for example, to the extraction of a hydrocarbon oil with a liquid solvent, such as furfural, having a greater density than the oil, and assuming that the oil is to be dispersed, the column is first filled with furfural. The rotor shaft is then turned in the direction of the arrow while additional furfural is admitted continuously (or intermittently) through the inlet pipe 8 and withdrawn at the bottom of the column (not shown), where also oil is admitted continuously. The oil is thereby dispersed within the furfural, the dispersion occurring mainly at the levels of the rotor baffles 14. The droplets of oil follow toroidal flow patterns within the compartments between adjoining stationary baffles 9 and 10 and also rise between adjacent compartments; this flow pattern and a mode of regulating the flow rates, are described in the said U.S. Patent No. 2,601,574.

The dispersed oil droplets settle upwards through the continuous phase of furfural, rising through the grid 15 into the settling zone S and coalesce to form a continuous oil layer 17 at the top of this zone, from which it is discharged through the pipe 8. The lower limit of the oil layer is indicated at 18 and is an interface between the coalesced oil and the continuous furfural phase 19 through which the oil droplets rise. There is, of course, no net transport of furfural through the grid and, for best results, also no actual flow of furfural. However, the ascending oil may carry within it some furfural, necessitating the downward flow of an equivalent quantity of furfural. This up-and-down flow of the continuous furfural phase is kept at a minimum according to the invention by promoting quiescence in the settling zone. The grid 15 dampens horizontal liquid motions, so that the rotational movement of the liquids beneath the grid are not transmitted in any significant degree to the settling zone and the formation of an interfacial vortex and the undesired consequences thereof are avoided. Hence the interface 18 is substantially horizontal and rapid phase separation takes place in the zone S. Also, the tangential admission of the furfural in the direction of rotation of the rotor discs through the one or more inlet pipes 6 causes the furfural to be distributed about the rotor shaft and throughout the entire height of the uppermost compartment between the stator baffle rings 10 and 11, without sudden change in momentum, thereby insuring a more gradual contact between the entering furfural and the oil rising from the lower compartments of the contactor; this avoids the undesired turbulence and break-up of the oil droplets into fine drops that would otherwise occur. Finally, the presence of the uppermost stator baffle ring 11 prevents immediate contact between the rapidly moving circumferential stream of furfural and the grid 15, so that the creation of undesired turbulences in the meshes of the grid is avoided.

It is further to be observed that wire-shaped fine-mesh packing materials, such as are often used as coalescing mats in contacting apparatus, are not necessary in the vortex-breaker grid 15 since the dispersed phase need not coalesce therein; coalescence of the oil drops can be effected more conveniently in the overlying settling zone S. Moreover, it is inconvenient to use a fine-mesh material in extraction operations since it tends to foul.

The invention described can be used to advantage not only in the extraction of lubricating oil with a selective solvent such as furfural, but is also suitable for oxidizing mercaptans present in light hydrocarbon oils (for example gasoline) by bringing this oil, in the presence of oxygen, into intimate contact with an aqueous solution of alkali metal hydroxide, containing preferably an auxiliary substance (called a solutizer) which promotes the solubility of the mercaptans in this solution. Suitable solutizers include, for instance, alkyl phenols such as cresols and xylenols. This treatment results in oxidation of mercaptans to disulphides.

We claim as our invention:

1. An apparatus for bringing at least partially immiscible phases into contact with each other which comprises an upright housing enclosing a contacting zone which is vertically elongated through an axial distance exceeding the diameter thereof, an enclosure containing a settling zone vertically juxtaposed to one end of the contacting zone and in free communication therewith over a major part of the cross-section thereof, inlet means communicating directly with the contacting zone, a rotary agitating device within the contacting zone mounted for rotation about an upright axis in spaced relation to the housing and including a shaft extending through said settling zone, and an outlet for settled phase communicating with the settling zone at a level remote from the contacting zone, the improvement which comprises a partition between said contacting and settling zones having substantially vertical surfaces disposed for damping horizontal motion of liquid flowing from the contacting zone into the settling zone, said surfaces having large horizontal intervals therebetween to provide wide flow passages for the free passage of a dispersion from the contacting zone into the settling zone, and a stationary sheath within the settling zone surrounding said shaft.

2. In a rotating disc contactor comprising a tubular shell enclosing a vertically elongated contacting zone and a settling zone vertically juxtaposed to and in free communication with the contacting zone over a major part of the cross-section thereof, a plurality of annular, stationary baffles fixed within the said contacting zone and extending from the shell wall to a central opening and dividing said shell into a series of compartments, the rotor shaft extending axially with respect to said shell through said openings, a plurality of disc-like rotor baffles fixed to said shaft, each rotor baffle being wholly within one of said compartments in axially displaced relation to the stationary baffles thereof, means for rotating said rotor shaft and rotor baffles, means for introducing fluid at axially displaced points directly into said contacting zone, an outlet for discharging fluid from said contacting zone at a level remote from said settling zone, and means for discharging fluid from said settling zone at a level remote from said contacting zone, the improvement comprising a vortex-breaking device that is situated between said contacting and settling zones, said device including a plurality of vertical walls disposed to dampen rotary motion of fluid and said walls being horizontally spaced apart by large intervals to provide wide flow passages for the free passage of a dispersion from the contacting zone into the settling zone, said means for introducing fluid into the contacting zone including an inlet disposed tangentially to said shell and situated adjacent said vortex-breaking device between the said device and the nearest rotor baffle, whereby fluid introduced therethrough is given a rotary motion about the axis of the shell, said means for rotating the rotor being disposed to turn the rotor in the same direction as the said entering fluid, and said contacting zone containing an annular, stationary baffle fixed within said shell between said inlet and said vortex-breaking device.

References Cited in the file of this patent

UNITED STATES PATENTS

| | | |
|---|---|---|
| 1,963,200 | Hawley | June 19, 1934 |
| 2,106,366 | Tijmstra | Jan. 25, 1938 |
| 2,205,986 | Mangelsdorf et al. | June 25, 1940 |
| 2,218,080 | Bottaro | Oct. 15, 1940 |
| 2,601,674 | Reman | June 24, 1952 |